United States Patent [19]

Washio et al.

[11] Patent Number: 5,128,986
[45] Date of Patent: Jul. 7, 1992

[54] PAIR FACSIMILE DEVICES

[75] Inventors: Michiyoshi Washio, Shiga; Minoru Ando, Nagoya, both of Japan

[73] Assignee: Murata Kikai Kabushiki Kaisha, Kyoto, Japan

[21] Appl. No.: 624,187

[22] Filed: Dec. 6, 1990

[30] Foreign Application Priority Data

Dec. 11, 1989 [JP] Japan ............................ 1-143494[U]

[51] Int. Cl.⁵ ........................................ H04M 11/00
[52] U.S. Cl. ..................................... 379/100; 358/400; D14/138; D14/147; D14/248; D14/148
[58] Field of Search .................... 379/100, 96-98; 358/400, 406, 407

[56] References Cited

U.S. PATENT DOCUMENTS 4,003,371 12/1976 Ogawa ............................... 358/435
4,962,526 10/1990 Kotani et al. ..................... 358/476

FOREIGN PATENT DOCUMENTS 133453 5/1989 Japan ................................. 358/400

Primary Examiner—James L. Dwyer
Assistant Examiner—Ahmad F. Matar
Attorney, Agent, or Firm—Spensley Horn Jubas & Lubitz

[57] ABSTRACT

A pair-facsimile device in which a pair of same kinds of facsimile devices are temporarily coupled to each other in a distributing channel starting from a manufacturer to a retailer shop, connected as one compact integral product and in case of using the facsimile devices, they are separated and each of them is installed at a requisite locations.

6 Claims, 4 Drawing Sheets

PAIR FACSIMILE DEVICES

FIELD OF THE INVENTION

This invention relates to pair facsimile devices in which two facsimile devices are made as one set.

RELATED ART STATEMENT

In recent years, facsimile devices have become widespread and are widely used in many homes. However, in the case of a facsimile device normally installed in a home, there are many cases in which a practical application of the home-use facsimile is different from a business-use facsimile with an assumption of communication with many indefinite partners. That is, it is almost always the case to use a telephone set together with a function of a facsimile device and in addition, these systems provide quite intimate reliability in communication between a person working a great distance from his home and his family or between a child studying far from his family and his parents or brothers or sisters or between a man and a woman having friendly relations with each other.

To the contrary, present facsimile devices are not manufactured and sold assuming such a communication system as one in which a person-to-person relation is applied for the communication. Accordingly, even in the case of the aforesaid relation, it is normal to purchase a single facsimile device in compliance with a preference of each of the users and have separate installation of the individual facsimile device.

Accordingly, the machine types or grades of the facsimiles to be used between the specific partners may be different from each other. Of course, even if the machine types of the present facsimile devices are different from each other, compatibility required for mutual communication is sufficiently assured and in the case of a high-grade facsimile machine, a so-called one-touch dialing or speed dialing is installed so as to provide convenient communication.

However, in the case of a pair of facsimile devices used between the aforesaid specific partners, a preset relation is present between these facsimile devices as one set of the same type of device enables both user and maker to get several benefits. That is, the two facsimile devices can be prepared through their purchasing once, their initial maintenance and repairing operations can be received simultaneously and further since the machine type and performance of a partner is known to those of a paired machine, they are convenient in their operation. In turn, from the manufacturer's perspective, since mass production of the facsimile can be realized, a reduction in manufacturing cost can be attained and transportation and displaying of the facsimile can be improved due to a reduction in size.

OBJECT AND SUMMARY OF THE INVENTION

The present invention provides new pair-facsimile devices acting as the same kinds of facsimile devices under the aforesaid unique technical concept.

The pair-facsimile devices of the present invention are constructed such that a pair of similar facsimile devices are temporarily combined to each other in such a way as they may be separated from each other.

That is, in the case of the present pair-facsimile devices, a pair of similar facsimile devices are temporarily coupled to each other in a distributing channel starting from a manufacturer to a retailer shop, connected as one compact integral product and in case of using the facsimile devices, they are separated and each of them is installed at a requisite location.

DETAILED DESCRIPTION OF PREFERRED EMBODIMENT

Figure 1:
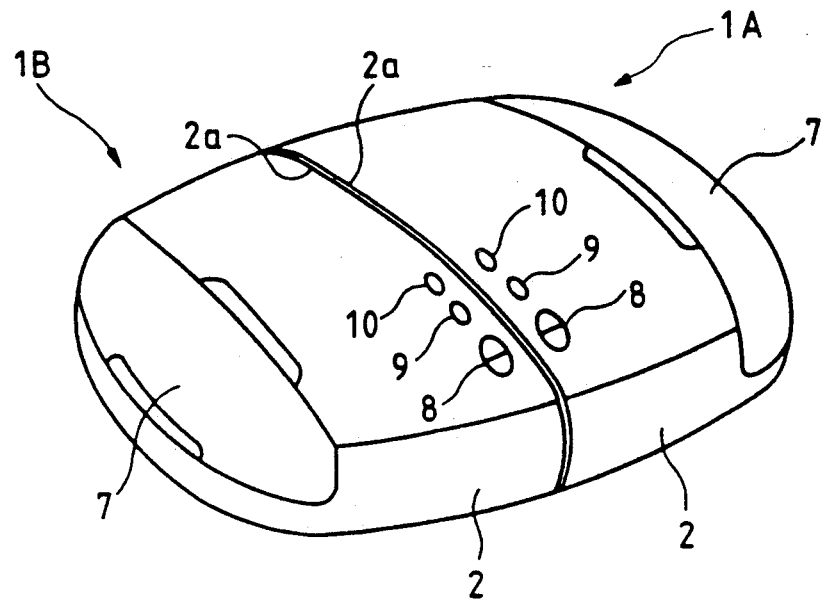
FIG. 1 is a perspective view for showing pair-facsimile devices to illustrate one preferred embodiment of the present invention.

Referring now to the drawings, some preferred embodiments of the present invention will be described.

In FIG. 1, one preferred embodiment of the pair-facsimile devices is illustrated. In the case of the pair-facsimile devices, a pair of right and left similar facsimile devices 1A and 1B are temporarily coupled to each other in such a way as they may be separated from each other. As a whole, they are cooperatively connected to each other to form a round-shaped longitudinal shape.

Figure 2:
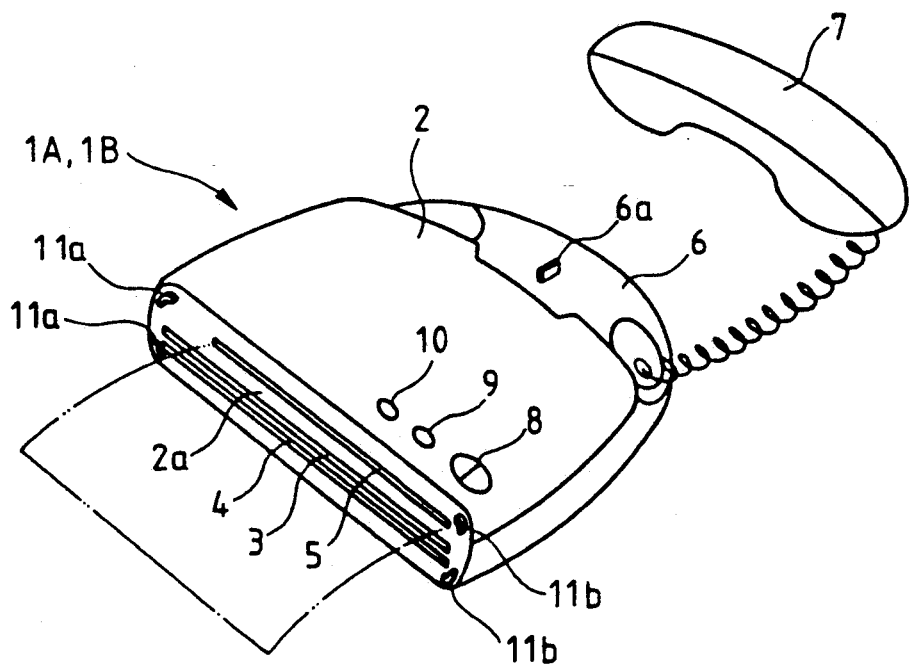
FIG. 2 is a perspective view for showing one separated facsimile device.

As shown in FIG. 2, the facsimile devices 1A and 1B have a common configuration and a front end surface 2a of a facsimile main body 2 acting as a connecting surface is provided with an inlet 3 and an outlet 4 for an original as well as a feeding port 5 for a recording sheet. At a concave part 6 formed by recessing one rear end of the device is removably mounted an arcular-shaped telephone set 7 to be aligned with the facsimile main body 2. In addition, the telephone set 7 is provided with a switch at its inner surface (not shown) which is turned ON or Off with a projection 6a projected from the recess 6 and further the telephone set 7 is provided with appropriate keys. In addition, at the upper surface of the facsimile main body located near a front end thereof are arranged several keys 8, 9 and 10 under a desired arrangement to be applied for absent-recording or a copying operation, for example. One of the keys (with a reference number 10) indicates a pair key newly installed in the present pair-facsimiles so as to monitor an operating part having a specific pair automatic dialing function to be described later.

Figure 3:
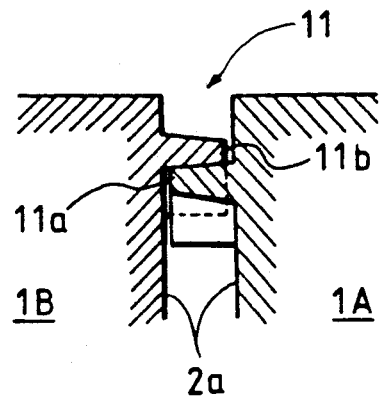
FIG. 3 is a sectional view for showing temporary coupled portion in the pair-facsimile devices.

As shown in FIGS. 2 and 3, the pair facsimile devices 1A and 1B are temporarily attached at both sides by a coupling means 11 arranged at the front end surface 2a of the facsimile main body 2 and their outer circumferences are cooperatively coupled in flush with each other. This coupling means 11 is sufficient if it has such a strength so as not to cause them to be easily separated during transportation or displaying of the facsimile devices, and various mechanisms can be applied for the facsimile devices. In the case of the present preferred embodiment, the engaging projections 11a and 11b are alternatively arranged at a corner part (or an entire circumference) of the front end surface 2a so as to forcedly fit both of them. A proper pattern (not shown) extending over both of them is uniformly applied to the surfaces of the coupled facsimile devices 1A and 1B.

A pair of facsimile devices 1A and 1B temporarily fitted and coupled to each other as described above are separated into two units during their practical operation and placed at each of the locations. The right and left facsimile devices 1A and 1B have a function to perform a pair-automatic dialing to a telephone number of the separated facsimile device (hereinafter called as a pair number) through one touch operation of the aforesaid pair key 10.

Figure 5:
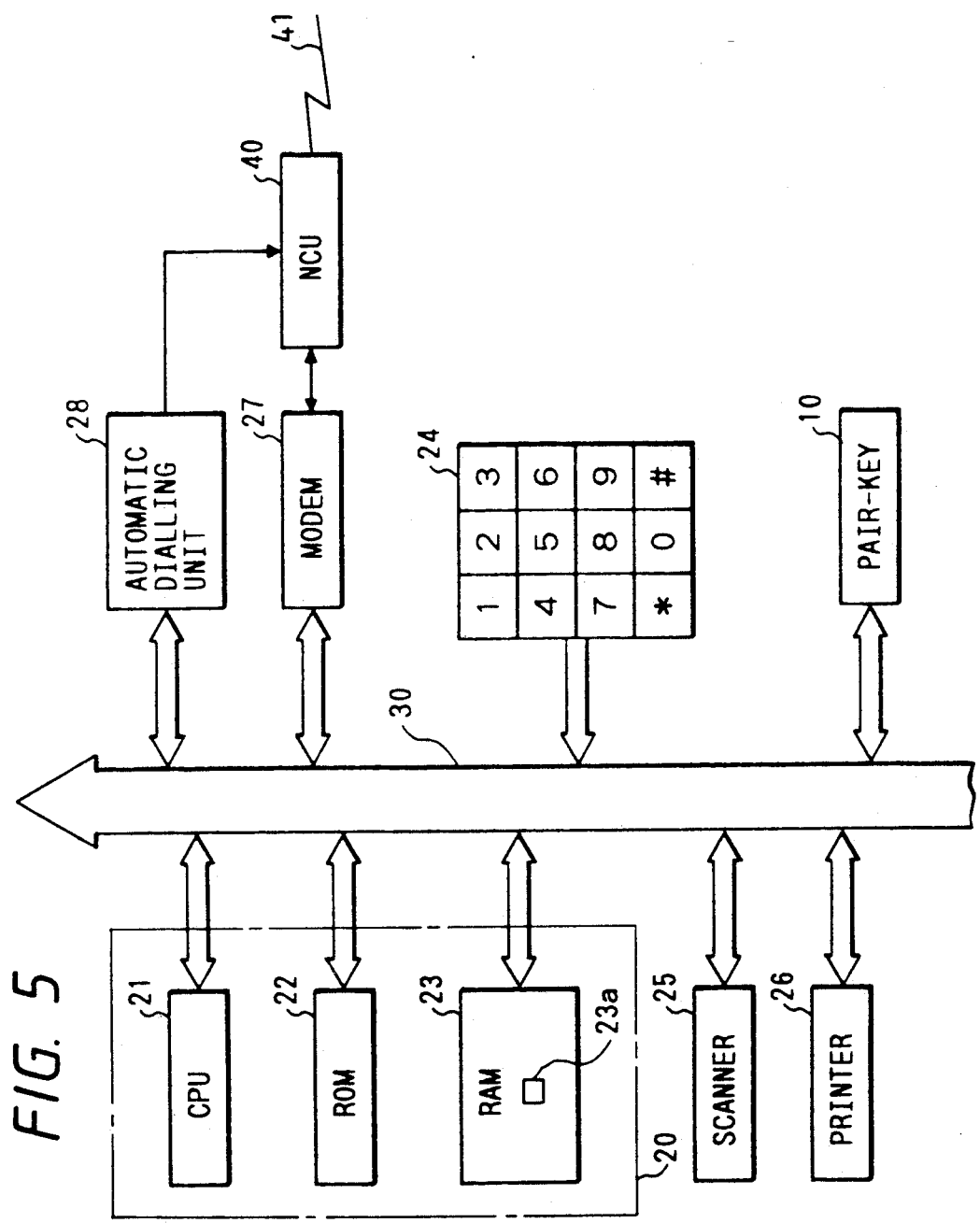
FIG. 5 is a block diagram for illustrating a system configuration of the pair facsimile devices.

FIG. 5 illustrates a system configuration of each of the facsimile devices 1A and 1B added with this pair-automatic dialing function. The facsimile devices have a control part (a micro-computer system) 20 including CPU 21, ROM 22 and RAM 23. Each of the input and output devices is connected to this control part 20 through a bus 30 so as to perform automatic control over communication or other operations. Then, the facsimile devices have as an input or output device such as a key pad 24 for at least addressing dials, a scanner 25 for reading an original image data during transmittance, a printer 26 for use in printing the image data when received, a MODEM 27 for modulating the transmitted data during a transmittance or a receiving operation and NCU 40 arranged between the MODEM 27 and a circuit 41 required for a connection with a communicating partner machine.

In the present facsimile devices 1A and 1B, the aforesaid pair key 10 is newly added to the aforesaid basis system as an input device. A pair number of the other facsimile device separated at the time of initial maintenance operation is written in a pair number memory part 23a arranged in RAM 23 in the control part 20. The pair key 10 is touched once during transmittance, the pair number stored in the aforesaid pair number memory part 23a is read out in accordance with the program written in ROM 22 of the controlling part 20, set in an automatic dialing bar of the controlling part 20 and then automatic dialing of the aforesaid pair number from the automatic dialing unit 28 through NCU 40 commences.

Figure 6:
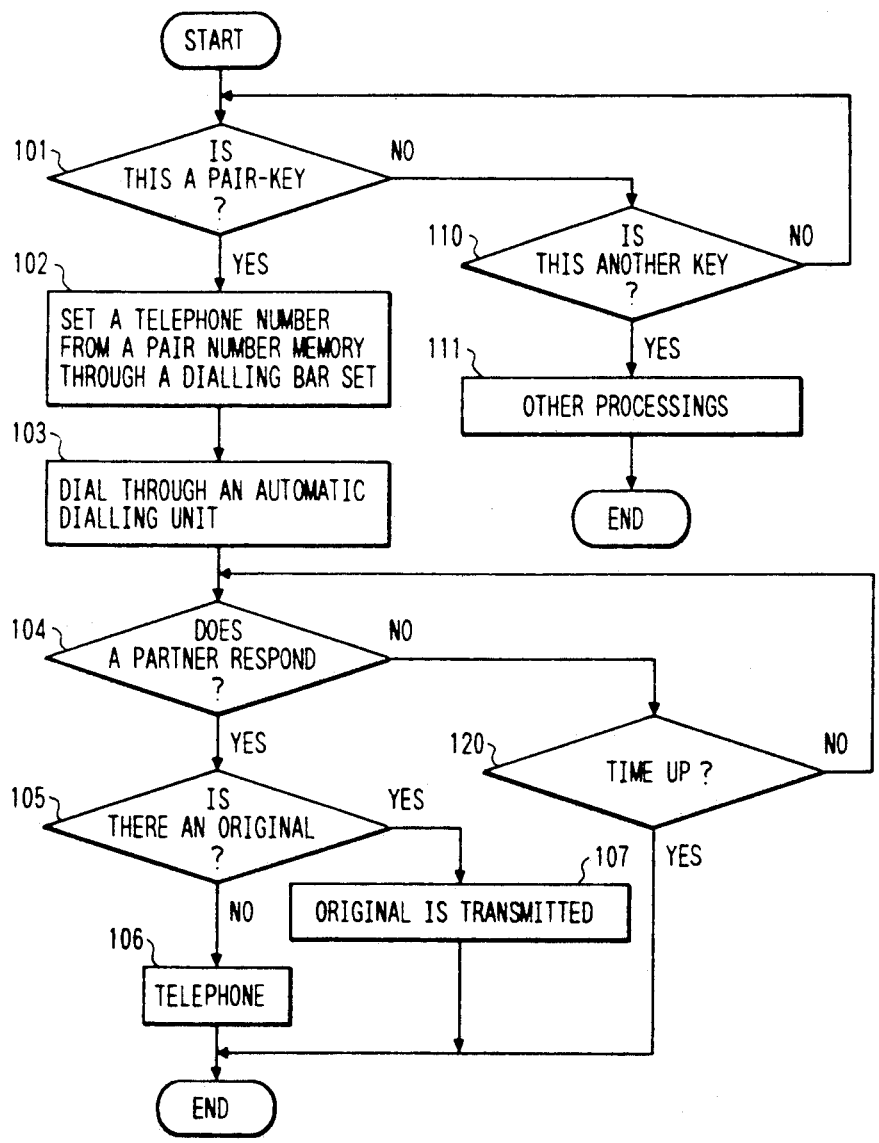
FIG. 6 is a flow chart for showing a software of a pair automatic dialling mechanism.

FIG. 6 illustrates a flow chart of the program stored in the controlling part 20 (ROM 22) for use in executing the aforesaid pair automatic dialing function.

Figure 7:
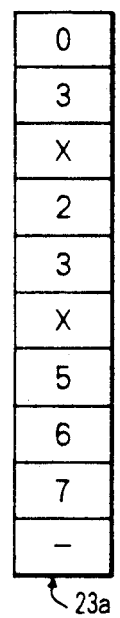
FIG. 7 is a table of registration number for indicating a pair number described in RAM pair number memory part.

In the present system, if the telephone set is picked up, for example, the system may start its operation by first checking a presence or absence of the touching at the pair key 10 (a step 101). In the case where the pair key 10 is not touched, a presence or absence of a touch of the other key such as the key pad 24 is discriminated (a step (110) and if the touch is present, a process (a step 111) corresponding to the object of the aforesaid key is performed and then the operation is finished. In turn, when the touch of the pair key 10 is discriminated, as shown in FIG. 7, the pair number (03X23X567) written in the pair number memory part 23a of RAM 23 is read out, this is set in the dialing bar (a step 102) and then this pair number is automatically dialed with the automatic dialing unit 28 in sequence to call up a telephone set of the pair number (a facsimile device) (a step 103).

At the next step, a presence or absence of a reply from a partner (a step 104) and if there is no reply, a correct time is measured in sequence at the step (120). Then, as the correct time exceeds a certain set time, the communication is automatically completed. In turn, when a reply of the partner machine is discriminated, at first a presence or absence of an original document (a step 105) at the scanner 25 is determined and if there is no document, the communication is carried out as if the facsimile device is a normal telephone (a step 106). In turn, when it is discriminated at a step (105) that there is an original, the original is transmitted through the facsimile device (a step 107) and upon completion of the transmittance, the communication is finished.

With such pair-facsimile devices constructed as above, the following advantages can be attained by both the maker and the user.

ADVANTAGES OF THE MAKER

①  Since the facsimile device can be made as a mass produced pair of product items, their manufacturing cost can be reduced.

②  Since a unified fashionable design can be applied and the product can be displayed at a store as a quite unique and new item with the facsimile devices being temporarily coupled, it is possible to generate a new demand for the facsimile device.

③  Since it is possible to ship the facsimile device under a temporary coupled compact state, the facsimile device can be conveniently adapted for a transportation and handling during its distributing phase.

④  As regards a low class facsimile device illustrated in the preferred embodiments, it is possible to set a function expecting an exclusive communication between the specified parties, i.e. a pair automatic dialing function through the pair-keys under a low cost.

ADVANTAGES OF THE USER

①  Two facsimile devices can be provided through one purchasing act and then it is possible to save a troublesome shopping operation and higher total expenditure.

②  In this case, it is also possible to get required initial maintenance simultaneously at two units and at this time if the pair numbers are registered simultaneously, troublesome registering of the dial number at the user side such as an already-present automatic dialing mechanism is not required subsequently.

③  Since the facsimile device owned by one person is the same type as that of a specified person, the function of the specified person's facsimile device can be understood in reference to that of the former device, resulting in that some disadvantages in handling operation of these facsimile devices caused by some differences in the machine types and performances of these two facsimile devices are not provided and the function of the facsimile devices can be fully utilized.

④  A convenience in communication can be attained through a pair-automatic dialing function with an exclusive pair-key. That is, even in case of a low class facsimile machine as shown in the drawings, an automatic dialing function similar to that of a high end facsimile device can be attained. In addition, in the case that a communicating state under a substantial person-to-person specific relation is assumed, an automatic dialing function only with a single pair-key does not require any troublesome selection of the key, resulting in more convenient use.

Figure 4:
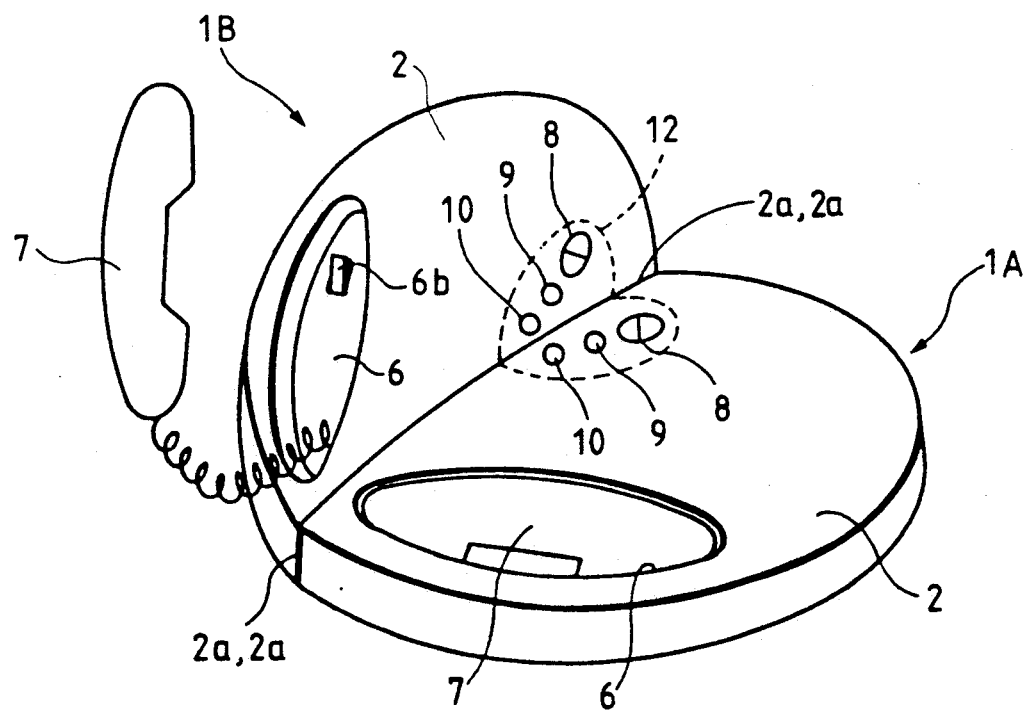
FIG 4 is a perspective view for showing pair-facsimile devices to illustrate another preferred embodiment of the present invention.

FIG. 4 illustrates another preferred embodiment, wherein a pair of right and left facsimile devices 1A and 1B are abutted to each other in such a way as they may form a heart-shape and they are temporarily coupled to each other. Reference numeral 12 denotes a colored surface pattern to show a heart pattern to enclose a part of the key. In this preferred embodiment, the telephone set 7 is set in a concave portion 6 arranged along the circumference of the facsimile main body 2. Reference numeral 6b denotes a switch for the telephone unit stored within the facsimile main body 2 and this switch is turned ON or OFF through an engagement or disengagement of the telephone set 7.

A pair of facsimile devices 1A and 1B are temporarily coupled as described above to enable various fashionable states not attained in a single unit to be realized.

In case of the pair-facsimile devices of the preferred embodiment illustrated, it can be used as long as the right and left pair facsimile devices 1A and 1b are separated from each other. However, in case of the temporary coupling in the present device, it includes such a system in which each of the front end surface 2a of the facsimile devices having an inlet and an outlet for an original document which are not abutted to each other. In this case, the pair-facsimile devices can be utilized as independent devices while they are being coupled to each other.

As described above, since the pair-facsimile devices of the present invention are constructed such that a pair of the same kinds of facsimile devices can be temporarily coupled in such a way as they may be separated from each other, if they are separated and utilized as communication devices between the specific partners having a special high reliability to each other, they may be well suited for the needs of pair-facsimile devices in view of their prices, functions and handling operations as well as their esthetic outer appearances.

What is claimed is:

1. A matched pair facsimile system comprising:
   a first facsimile device capable of transmitting and receiving facsimile communications to and from a remote facsimile machine.
   a second facsimile device capable of transmitting and receiving facsimile communications to and from the remote facsimile machine, the first and second facsimile devices being independently operable, and
   a coupling device for mechanically, removably coupling the first and second facsimile devices, wherein the first and second facsimile devices are coupled during shipping and are separately installed during operation, wherein the coupling device includes a plurality of projections disposed on respective opposing surfaces of each of the first and second facsimile devices, the coupling device providing for secure coupling of the first and second facsimile devices during transportation of the matched pair facsimile system.

2. A matched pair facsimile system according to claim 1, wherein the plurality of projections are respectively disposed at a plurality of predetermined locations about the respective opposing surfaces of the first and second facsimile devices.

3. A matched pair facsimile system according to claim 2, wherein a plurality of projections are disposed about an entire circumference of each of the respective opposing surfaces of the first and second facsimile devices.

4. A matched pair facsimile system according to claim 3, wherein the projections disposed on surface of the first facsimile device and the projections disposed on a surface of the second facsimile device forcibly fit with each other to securably couple the first and second facsimile devices together.

5. A matched pair facsimile system according to claim 1, wherein the projections disposed on a surface of the first facsimile device and the projections disposed on a surface of the second facsimile device forcibly fit with each other to securably couple the first and second facsimile devices together.

6. A matched pair facsimile system according to claim 2, wherein the projections disposed on a surface of the first facsimile device and the projections disposed on a surface of the second facsimile device forcibly fit with each other to securably couple the first and second facsimile devices together.

* * * * *